United States Patent [19]

Klemann et al.

[11] 4,279,976

[45] Jul. 21, 1981

[54] PSEUDOHALIDE-CONTAINING SALTS FOR ELECTROLYTES OF ALKALI-METAL ELECTROCHEMICAL DEVICES

[75] Inventors: Lawrence P. Klemann, Somerville; Gerald H. Newman, Westfield, both of N.J.

[73] Assignee: Exxon Research & Engineering Co., Florham Park, N.J.

[21] Appl. No.: 166,066

[22] Filed: Jul. 7, 1980

[51] Int. Cl.³ .............................................. H01M 6/14
[52] U.S. Cl. ................................... 429/197; 429/198; 429/199
[58] Field of Search ............... 429/194, 198, 197, 199, 429/218; 260/145 R, 157, 165, 30.6 R

[56] References Cited

U.S. PATENT DOCUMENTS

| | | | |
|---|---|---|---|
| 4,060,674 | 11/1977 | Klemann et al. | 429/194 |
| 4,104,450 | 8/1978 | Whitney et al. | 429/194 |
| 4,104,451 | 8/1978 | Klemann et al. | 429/194 |
| 4,117,213 | 9/1978 | Whitney et al. | 429/194 |
| 4,139,681 | 2/1979 | Klemann et al. | 429/191 |

*Primary Examiner*—Anthony Skapars
*Attorney, Agent, or Firm*—Robert S. Salzman

[57] ABSTRACT

A class of electrolytes for alkali-metal electro-chemical devices is featured, which contains at least one complex anion salt in an organic solvent. The complex anion salt has the general formula:

$$ZMR_xQ_y$$

wherein Z is an alkali metal;
wherein M is B, P, As, and Al;
wherein R is selected from a group consisting of heteroatom-containing groups bonded to the core element M through the heteroatom site, aryls, alkaryls, F, Cl, Br, fluorine substituted aryls, and fluorine substituted alkaryls;
wherein Q is selected from a group consisting of SCN⁻, SeCN⁻, CN⁻ and OCN⁻; and
wherein x and y are integers, the sum of x and y is equal to one plus the valence of M, and further wherein x can be zero.

13 Claims, 5 Drawing Figures

0.17 LiBF(NCS)₃, 0.83 LiB(NCS)₄ IN DME

[Li⁺] (MOLAL)

PSEUDOHALIDE-CONTAINING SALTS FOR ELECTROLYTES OF ALKALI-METAL ELECTROCHEMICAL DEVICES

RELATED U.S. PATENTS

The following U.S. patents are cited to provide a background for the present invention: U.S. Pat. Nos. 4,139,681, issued Feb. 13, 1979; and 4,169,808, issued Oct. 2, 1979.

These patents are assigned to a common assignee, and as far as their teachings can provide a comparison with the invention, are meant to be incorporated herein by way of reference.

FIELD OF THE INVENTION

The invention relates to alkali-metal electrochemical devices, and more particularly to a class of improved electrolytes containing complex anion salts.

BACKGROUND OF THE INVENTION

In alkali-metal electrochemical devices, such as Li/TiS$_2$ battery systems, the search for effective electrolytes has led researchers to utilize complex anion salts dissolved in organic solvents. The complexity of these salts is evident from their general formula:

ZMR$_x$Q$_y$ wherein Z is an alkali metal; M is a core element, such as boron, R and Q are various groups attached to the core element M; and x and y are integers having a sum equal to one plus the valence of the core element, M.

As a result of the complexity of these salts, it is a difficult task to predict beforehand which salt formulation will make an effective electrolyte.

An effective electrolyte will usually contain a salt which is highly soluble in its organic solvent, as well as one which exhibits high conductivity.

It has been discovered that salts of the above-mentioned formula having pseudohalide substituents bonded to the core element, M, have favorable solubilities in aprotic organic solvents and exhibit high conductivities. In addition, salts having these pseudohalide substituents are very cost effective, i.e., they are inexpensive with respect to other similar complex anion salts of this type.

BRIEF SUMMARY OF THE INVENTION

The invention pertains to electrolytes for alkali-metal electrochemical devices comprising an organic solvent and at least one electrolytically active alkali-metal complex anion salt. The organic solvent may be selected from a group consisting of ethers, esters, sulfones, organic sulfates, organic nitrites and organo nitro compounds. Amongst these solvents, the preferred choice is a solvent containing at least one ether, such as dioxolane.

The complex anion salt of this invention has the formula:

ZMR$_x$Q$_y$ wherein Z is a alkali metal;
wherein M is an element selected from a group consisting of B, Al, P and As;

wherein Q is at least one pseudohalide selected from a group consisting of: SCN$^-$, SeCN$^-$, CN$^-$, and OCN$^-$;

wherein R is selected from a group consisting of: heteroatom-containing groups bonded to M, the core element, through the heteroatom site, aryls, alkaryls, F, Cl, Br, fluorine-substituted aryls, and fluorine-substituted alkaryls; and wherein x and y are positive integers, a sum of x plus y being equal to one plus the valence of the metal M, and further, wherein x can be zero.

By the phrase "at least one electrolytically active alkali-metal complex anion salt", it is meant those salt solutes which may contain more than one complex anion salt, or a combination of one or more complex anion salts mixed with other commonly used alkali salts.

The alkali metal Z is selected from the group Li, Na, and K, with Li being preferable.

The core element M is preferably B.

The heteroatom-containing groups defined by R are selected from a group consisting of:

where X' is an alkyl having 1 to 3 carbon atoms.

The heteroatom-containing groups R are preferably:

Where R represents an aryl, the preferred aryl is a phenyl radical.

Where R represents a fluorine-substituted aryl, the preferred fluorine-substituted aryl is a para-fluorophenyl radical.

It is an object of this invention to provide an improved class of electrolytes for use in alkali-metal electrochemical devices;

It is another object of the invention to provide a class of low-cost, effective electrolytes containing a complex anion salt having pseudohalide substituents.

These and other objects of this invention will be better understood and will become more apparent with reference to the following detailed description considered in conjunction with the accompanying drawings.

DETAILED DESCRIPTION OF THE INVENTION

Generally speaking, the present invention is for improved electrolytes containing complex anion salt solutes in an organic solvent, wherein the complex anion salt solute has the general formula:

$$ZMR_xQ_y$$

wherein Z is an alkali metal;
wherein M is an element selected from a group consisting of B, Al, P and As;
wherein Q is at least one pseudohalide selected from a group consisting of: $SCN^-$, $SeCN^-$, $CN^-$ and $OCN^-$;
wherein R is selected from a group consisting of: heteroatom-containing groups bonded to M, the core element, through the heteroatom site, aryls, alkaryls, F, Cl, Br, fluorine-substituted aryls, and fluorine-substituted alkaryls; and
wherein x and y are positive integers, a sum of x plus y being equal to one plus the valence of the metal M, and further,
wherein x can be zero.

The following is a list of complex anion salts fitting the general formula $ZMR_xQ_y$ as set forth herein.

These complex anion salts are presented as a teaching of the present invention and are not meant to limit the scope thereof:

$Na^+BCl_2(NCS)(CN)^-$ $K^+B(NCS)(CN)_2(OCN)^-$ $Li^+Al(NCS)_2(C_6H_4-p-CF_3)_2^-$ $Na^+Al(NCS)_2(SeCN)_2^-$

The pseudohalide substituents of this invention as defined by the aforementioned grouping have been found to provide useful electrolytes from both a cost-effective and performance standpoint as described in detail in the following examples:

GENERAL EXPERIMENTAL DESCRIPTION

All reactions were carried out under an atmosphere of dry nitrogen in a Vacuum Atmospheres dry box. Dimethoxyethane (DME) was dried by distillation from sodium-benzophenone ketyl. Diethyl ether was dried over activated molecular sieves. A Jeol FX-90 spectrometer (operating at 28.7 MHz) was used to record $^{11}B$ NMR spectra versus tris (ethanol) amineborate external reference in dimethylsulfoxide-$d_6$. A Varian EM-360 spectrometer (60 MHz) was used for $^1H$ NMR spectra versus external tetramethylsilane. All NMR data are reported in PPM. Resistivities were measured at ambient temperature in a Yellow Springs Instrument Company dip-type cell (cell constant 1/cm) using a Barnstead A.C. bridge operating at 1 KHz.

EXAMPLE 1

Anhydrous LiSCN (5.2 g, 80 mmol) is combined with 100 mL of DME and to this slurry is added, with stirring, $BF_3$.etherate (11.4 g, 80 mmol). The resulting solution (which is ~0.87 molal in $Li^+$ concentration) is stirred for about two hours at which time a specific resistivity of 100 ohm cm is measured. The solution is evaporated to give 12.4 g of a viscous liquid which is 1.8 g more than the theoretical yield for a lithium salt, indicating retention of a small amount of coordinated solvent.

A portion of this viscous liquid product is dissolved in DME and is analyzed by $^{11}B$ NMR which shows five distinct and interpretable boron chemical shifts: δ−16.0, $LiBF_4$, (38%); δ−18.2, $LiBF_3(NCS)$, (41%); δ−21.3, $LiBF_2(NCS)_2$, (7%); δ−26.2, $LiBF(NCS)_3$, (8%); and δ−31.7, $LiB(NCS)_4$, (6%).

The example clearly shows that lithium salts of boron complex anions containing pseudohalide substituents are extremely conductive and can be employed addmixed with salts like $LiBF_4$.

EXAMPLE 2

The resistivity of diethyl ether is measured and the result is recorded in Table I below. Anhydrous LiSCN (3.3 g, 51 mmol) is dissolved in 75 mL of dry diethyl ether and the resistivity of this solution is measured and the result is also presented in Table I below. A solution of $BF_3$.etherate (7.3 g, 51 mmol) in 5 mL of diethyl ether is then added giving rise to an exothermic reaction. After the resulting solution cools to room temperature its resistivity is measured and this result is listed in Table I.

TABLE I
RESISTIVITIES OF PURE SOLVENT AND SALT SOLUTION

| Sample (conc., molal) | Resistivity (ohm cm) |
|---|---|
| Diethyl Ether | $25 \times 10^7$ |
| LiSCN-diethyl ether ($\approx 0.96$) | $\approx 10^7$ |
| LiSCN-BF$_3$-diethyl ether ($\approx 0.86$) | 4000 |

A portion of the highly conductive diethyl ether solution of LiSCN+BF$_3$ is analyzed by $^{11}$B NMR which shows the presence of the following boron complex anion salts: LiBF$_4$, LiBF$_3$(NCS), LiBF$_2$(NCS)$_2$, LiBF(NCS)$_3$, and LiB(NCS)$_4$. The appearance of the $^{11}$B NMR spectrum in this case is very similar (in both qualitative and semi-quantitative aspects) to that obtained in DME and described above in Example 1.

The fact that any LiBF$_4$ is present in diethyl ether solution is very surprising since an independent attempt to dissolve a commercially available sample of LiBF$_4$ in diethyl ether shows the salt to be essentially insoluble. Apparently the mixture of salts with complex anions containing isothiocyanate (pseudohalide) substituents acts to substantially enhance the solubility of LiBF$_4$ in diethyl ether.

The diethyl ether solution obtained in this example is concentrated in vacuo to give a white solid and a pale yellow viscous liquid. By x-ray diffraction analysis and $^{11}$B NMR (in DME) the solid is characterized as LiBF$_4$. Using $^{11}$B NMR analysis the pale yellow viscous liquid (in DME) is characterized as a mixture of 17% LiBF(NCS)$_3$ and 83% LiB(NCS)$_4$.

Figure 1:
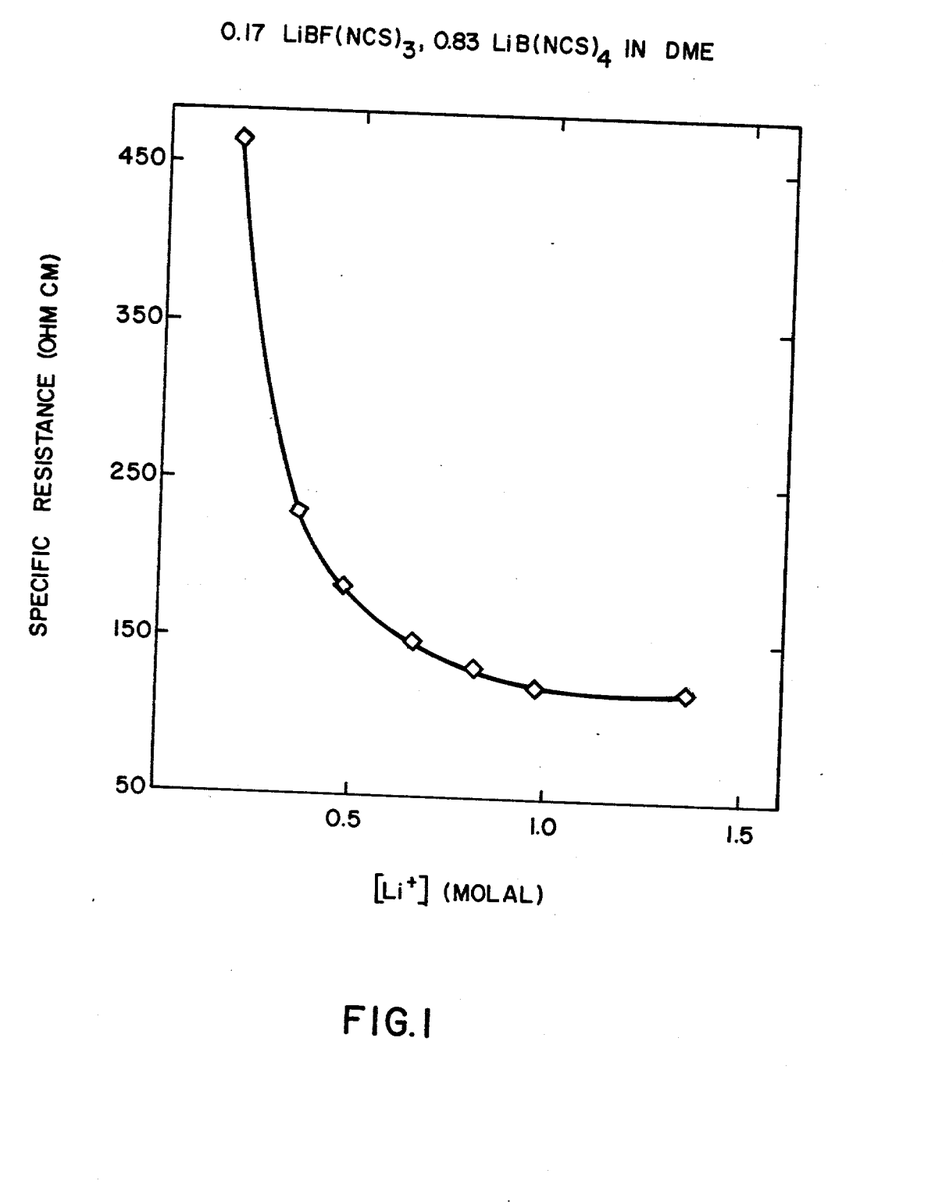
FIG. 1 is a graph representing concentration dependence of the resistivity for a mixture of $LiB(NCS)_4$:$LiBF(NCS)_3$ (83:17) in DME.

The resistivity of these salts in DME is determined as a function of electrolyte salt concentration and the result is plotted in FIG. 1. The data contained in the figure shows that Li$^+$ salts of boron complex anions which contain pseudohalide substituents have low resistivities and are therefore useful as electrolytes in alkali metal battery cells.

EXAMPLE 3

A sample of NaSCN (2.4 g, 30 mmol) is dissolved in 40 mL of DME and the solution is slowly cooled to subambient temperature. Between minus 7 and minus 16° C. the salt or a solvated form thereof precipitates from solution and rapidly re-dissolves when the temperature of the solution is allowed to rise above about −7° C. BF$_3$.etherate (4.3 g, 30 mmol) is added to the cooled solution and the temperature of the new solution is immediately lowered to about −70° C. at which point the solution remains clear. Upon lowering the temperature of the new solution between −72° and −78° C., precipitate forms which rapidly redissolves above about −70° C. A $^{11}$B NMR spectrum of the new solution shows it to contain 29% LiBF$_4$, 45% LiBF$_3$(NCS), 23% LiBF$_2$(NCS)$_2$ and 3% LiBF(NCS)$_3$.

Both the spectral analysis and physical properties (i.e. solubility) of the new solution indicate that formation of boron complex anions with pseudohalide substituents is very fast and that ionic sodium salts are useful in solvents like DME for organic electrolytes which remain in homogeneous solution even at very low temperatures.

EXAMPLE 4

Dry NaOCN (3.25 g, 50 mmol) is dissolved in 75 mL of DME and the resistivity of the solution is found to be 50,000 ohm cm. BF$_3$.etherate (7.01 g, 50 mmol) is added and the resistivity of the final solution is determined and found to be 380 ohm cm. A $^{11}$B NMR spectrum of the final solution reveals evidence for four new salts along with LiBF$_4$. The four new salts are Na$^+$ salts of boron complex anions containing different proportions of F$^-$ and/or OCN$^-$ substituents.

The low resistivity value measured for the final solution indicates that OCN$^-$ containing complex anion salts of Na$^+$ are useful as organic electrolytes.

EXAMPLE 5

Figure 2:
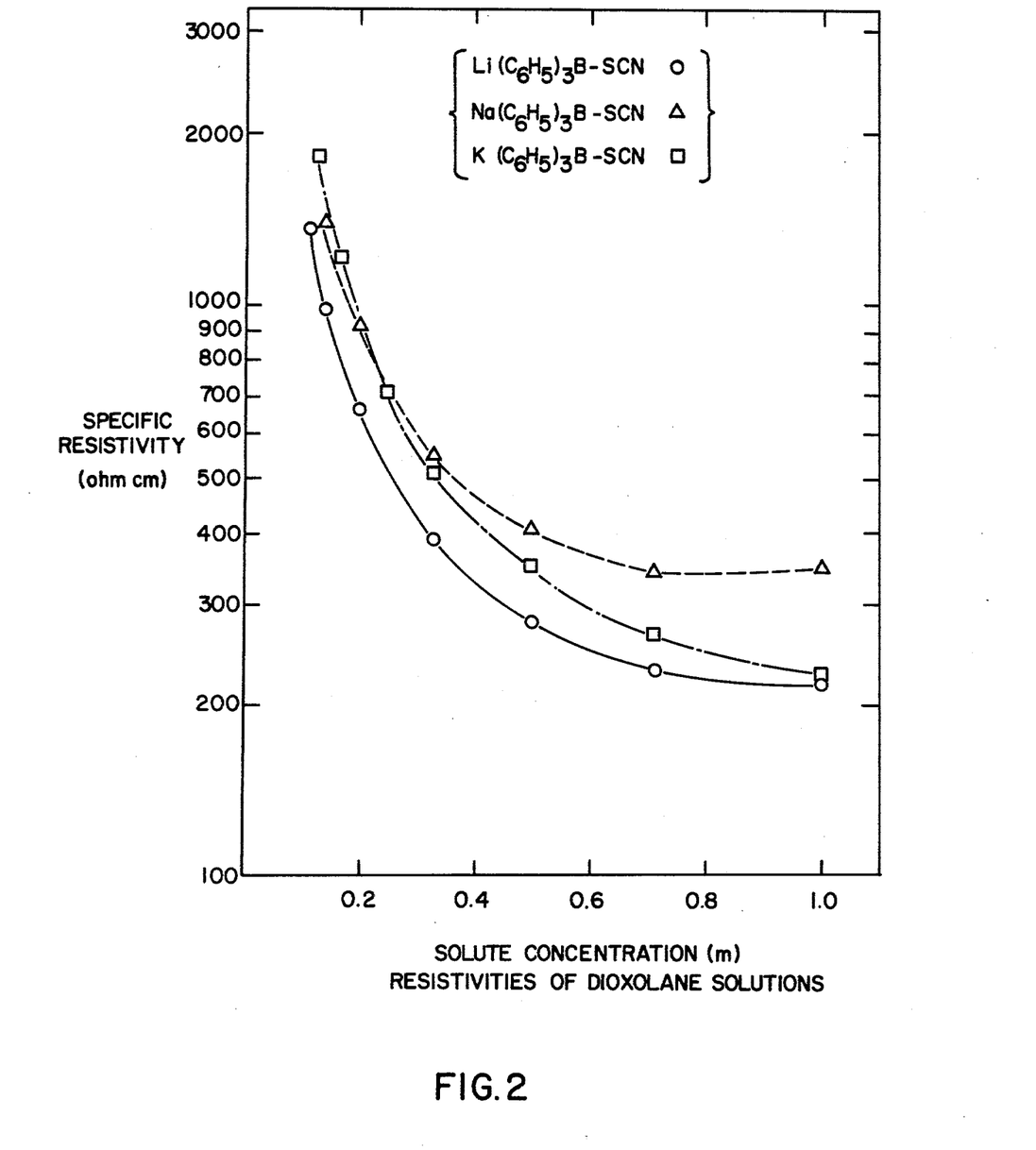
FIG. 2 is a graph representing concentration dependence of the resistivity for $M^+B(C_6H_5)_3SCN^-$ (M=Li, Na, K) in dioxolane.

To triphenylboron (6.05 g, 25 mmol) in 25 mL of dioxolane is added 1.63 g (25 mmol) LiSCN resulting in a clear solution and evidence of a mildly exothermic reaction. A 5 mL aliquot of this solution is used to measure the resistivity of this electrolyte as a function of decreasing solute concentration in dioxolane, and the results are presented in FIG. 2. The final dilution is returned to the original solution and the total is concentrated on a vacuum rotary evaporator to give a mixture of liquid and crystals. The latter (12 g) are isolated by filtration and are characterized by proton NMR and elemental analysis.

The NMR spectrum (DME solution) shows a multiplet (6.5–7.1 δ, aromatic protons) and peaks at 3.45 and 4.45 δ for dioxolane (4 mols/mol Li$^+$).

Analysis; Found: C, 60.32; H, 6.45; N, 2.36%. (C$_6$H$_5$)$_3$BSCN$^-$Li$^+$(dioxolane)$_4$ requires: C, 61.70; H, 6.46; N, 2.32%.

This example shows that salts of complex anions which contain both pseudohalide and aromatic substituents are ionically conductive and are isolatable materials.

EXAMPLE 6

To 6.05 g (25 mmol) triphenylboron in 25 mL dioxolane is added 2.03 g (25 mmol) NaSCN. With vigorous stirring (magnetic stirrer) and gentle warming the solids dissolve to become a clear solution. An aliquot of this solution is employed to measure the resistivity of this electrolyte as a function of decreasing solute concentration in dioxolane and the results are recorded in FIG. 2. The final dilution is returned to the original solution and the total is evaporated to dryness. The solid obtained is analyzed by proton NMR in DME and is found to contain ~4 mols of dioxolane/mol Na$^+$. The solid is vacuum dried in order to obtain a sample which is substantially free of dioxolane for an elemental analysis.

Analysis, Found: C, 68.49; H, 4.65; N, 5.11%. (C$_6$H$_5$)$_3$BSCN$^-$Na$^+$.(dioxolane)$_{0.25}$ requires: C, 69.42; H, 4.87; N, 4.10%.

EXAMPLE 7

According to the manner described in Example 6, 6.05 g triphenylboron, 25 mL dioxolane, and 2.43 g (25 mmol) KSCN are combined and are warmed to 40° C. with vigorous stirring to produce a solution whose resistivity is measured. The results are presented in FIG. 2. Isolation of the electrolyte salt by evaporation yields 11 g of solid. Proton NMR analysis of this solid in DME reveals characteristic aromatic proton resonances between 6.6–7.1 δ and approximately one mol of dioxolane/mol K$^+$. An analytical sample is prepared by vacuum treating the isolated solid at 35° C. for two days to remove coordinated dioxolane.

Analysis, Found: C, 64.68; H, 4.77; N, 3.61%. $(C_6H_5)_3BSCN^-K^+$ requires: C, 67.25; H, 4.46; N, 4.13%.

EXAMPLE 8

Figure 3:
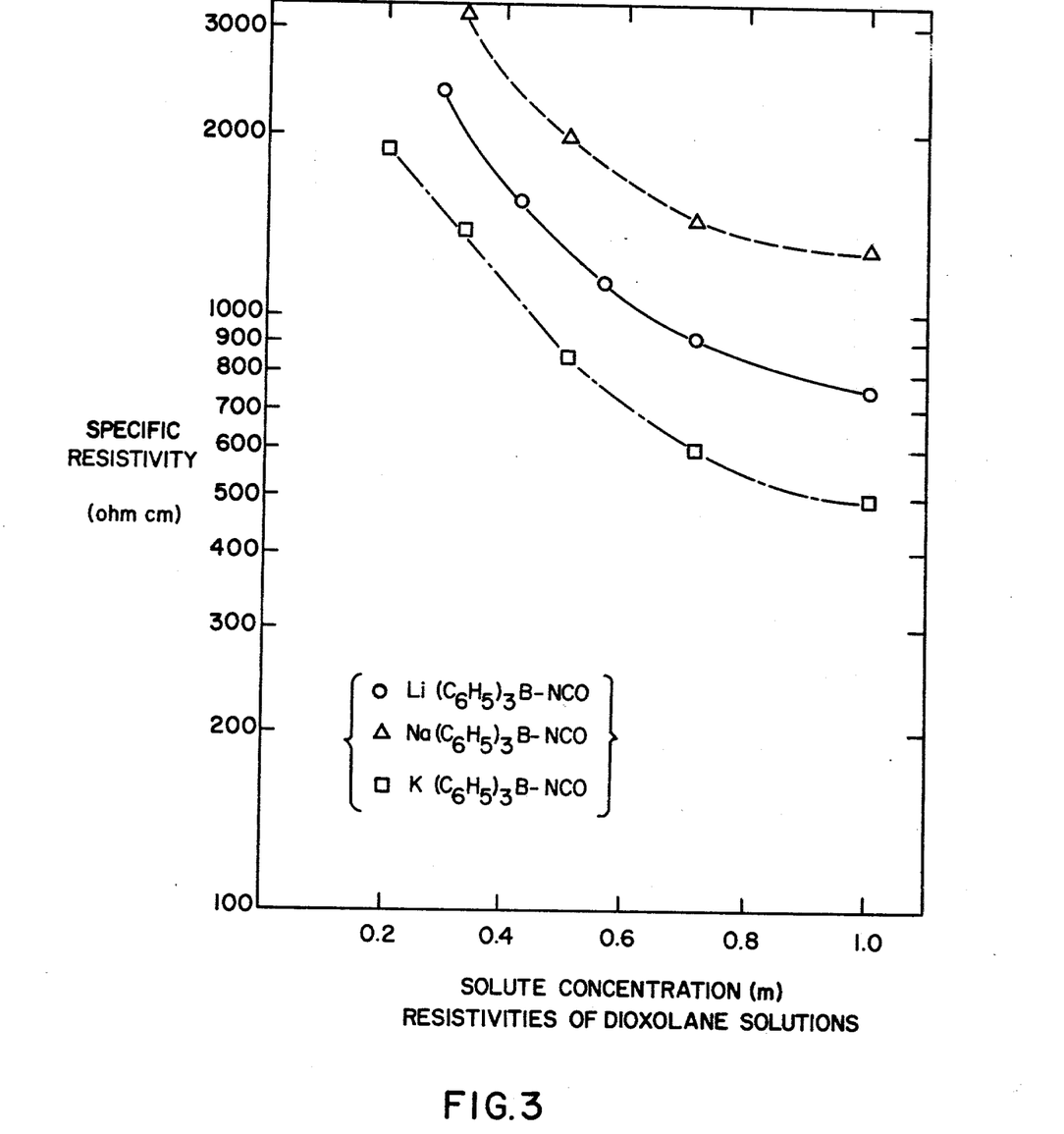
FIG. 3 is a graph representing concentration dependence of the resistivity for $M^+B(C_6H_5)_3NCO^-$ (M=Li, Na, K) in dioxolane.

To a sample of triphenylboron (6.05 g, 25 mmol) in 25 mL of dioxolane is added 1.63 g (25 mmol) NaOCN and the mixture is stirred vigorously for ½ hour to produce a clear solution. The resistivity of this solution is 1280 ohm cm and the affect of dilution on the resistivity is measured and is recorded in FIG. 3. The final dilution is recombined with the original solution and the total is evaporated to dryness and the solid salt residue is maintained at 35° C. in vacuo for two days (6.5 g yield; theory 7.68 g). A sample of this solid is dissolved in DME and the slightly cloudy solution is analyzed by proton NMR which shows characteristic aromatic proton resonances between 6.4–7.1 δ and no coordinated dioxolane.

EXAMPLE 9

In the manner described in Example 8, 6.05 g triphenylboron 25 mL dioxolane, and 1.63 g NaOCN are combined to give a clear solution. Lithium chloride (1.06 g, 25 mmol) is then added and stirring is continued for about two days. The heterogeneous mixture is filtered to afford 1.4 g (97% yield) of NaCl (which is identified by its x-ray diffraction pattern) and a clear solution (whose resistivity is 745 ohm cm). Subsequent dilution of an aliquot of this solution with dioxolane enables resistivity values to be obtained as a function of solute concentration and the results are presented in FIG. 3. All solutions are combined and are evaporated to give 7.3 g of a solid product (95% of theory). A proton NMR spectrum of the material in DME reveals a complex multiplet between 6.5–7.2 δ which is characteristic for a complex anion adduct of triphenylboron. The spectrum contains no evidence for residual dioxolane in the solid product.

Analysis, Found: C, 77.09; H, 5.22; N, 4.97%. $(C_6H_5)_3BNCO^-Li^+$ requires: C, 78.40; H, 5.19; N, 4.81%.

This example demonstrates a technique to generate a lithium electrolyte from a sodium electrolyte by a salt metathesis reaction in dioxolane.

EXAMPLE 10

Triphenylboron (6.05 g, 25 mmol), 25 mL of dioxolane, and 2.03 g (25 mmol) KOCN are combined and after warming to 35° C. with vigorous stirring a clear solution is obtained. The resistivity of this solution is 490 ohm cm and the resistivity is measured after successive dilutions with dioxolane and the results are presented in FIG. 3. Evaporation of the combined dioxolane solution affords a solid product.

Analysis, Found: C, 69.09; H, 4.83; N, 3.83%. $(C_6H_5)_3BNCO^-K^+$ requires: C, 70.60; H, 4.65; N, 4.34%.

EXAMPLE 11

Figure 4:
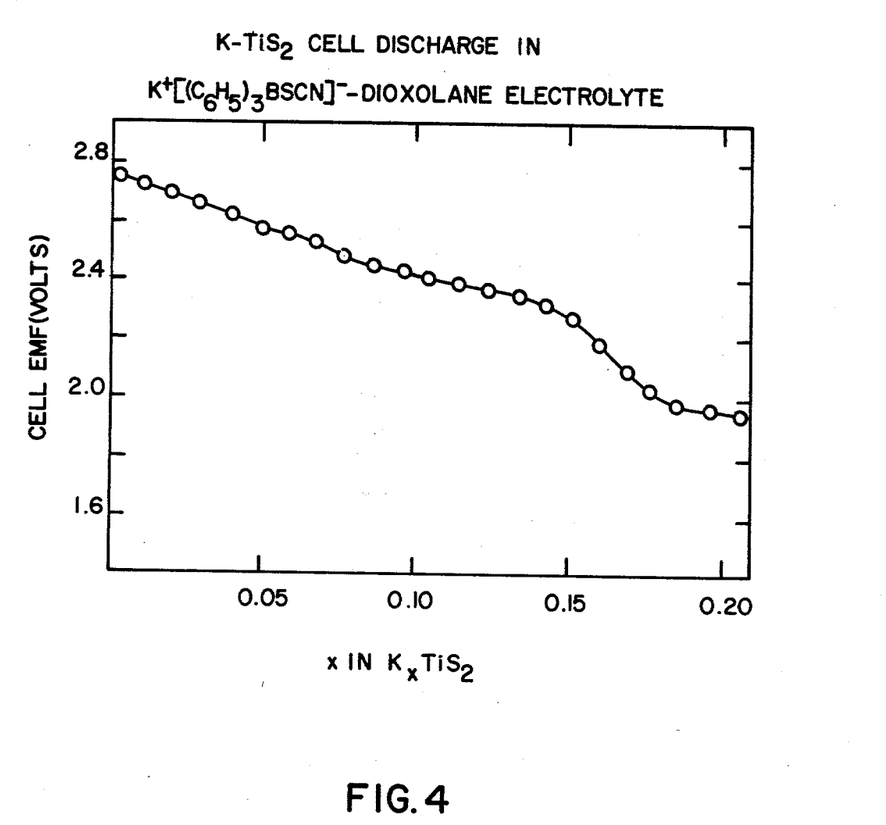
FIG. 4 is a graph representing total K-$TiS_2$ cell EMF vs. x in $K_xTiS_2$.

The electrolyte of Example 7 (a dioxolane solution of $(C_6H_5)_3BSCN^-K^+$) is employed in a battery cell containing a one inch square pressed powder $TiS_2$ cathode and a one inch square of expanded metal screen containing a thin slab of potassium metal as the anode. This cell is assembled according to standard practices and is discharged. The total cell EMF (in volts) is monitored as a function of cathode composition and the results are presented in FIG. 4.

This example demonstrates that alkali metal salts of boron complex anions containing pseudohalide substituents are electrolytes in dioxolane and can be employed in electrochemical devices such as alkali metal-transition metal chalcogenide battery cells.

EXAMPLE 12

Figure 5:
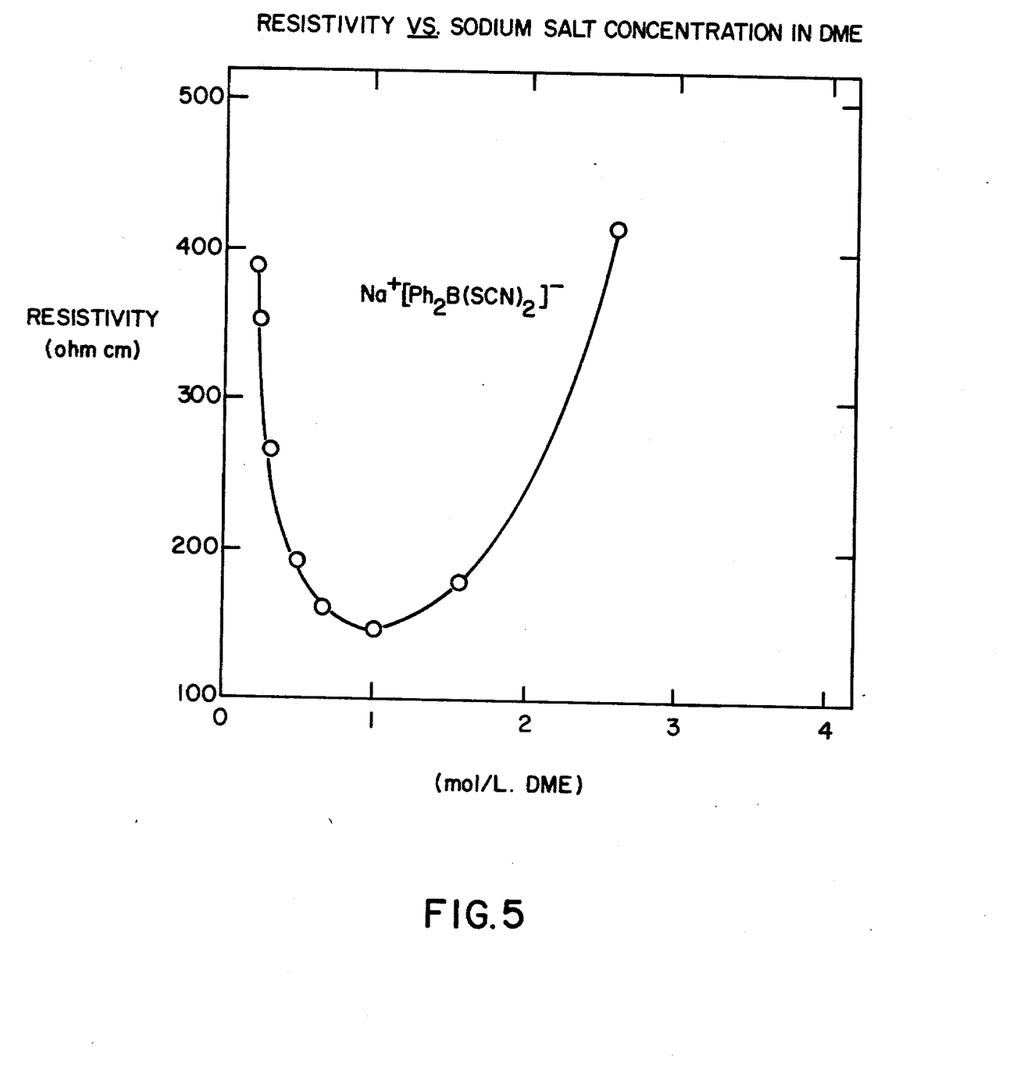
FIG. 5 is a graph representing concentration dependence on the resistivity of $Na^+B(C_6H_5)_2(SCN)_2^-$ in DME.

To a solution of NaSCN (2.43 g, 30 mmol) in 25 mL of DME is added, dropwise, 3.0 g (15 mmol) diphenylboron chloride giving rise to a precipitate. After this addition is complete, the mixture is warmed to 80° C. for 30 minutes then is filtered to give 1.15 g of a solid which is mostly NaCl. The filtrate is concentrated and one aliquot examined by proton NMR is found to have ~2.5 mol $[Na^+B(C_6H_5)_2(SCN)_2^-]$ per liter of DME. Another aliquot is found to have a resistivity of 421 ohm cm and upon dilution with more DME, the resistivity is found to decrease to a minimum value of ~143 ohm cm at approximately 1.0 mol/L of DME (the resistivity values measured vs. solute concentration are displayed graphically in FIG. 5).

The combined DME solutions which contain the complex anion salt product are evaporated to an oily residue. This is extracted with hot toluene and is then placed in a freezer (~minus 20° C.) to promote crystallization. On subsequent filtration a yield of 5.5 g of crystalline material is obtained.

This crystalline product is analyzed by proton NMR in acetone-$d_6$: a complex aromatic proton multiplet is found between 6.4–7.0 δ for the $(C_6H_5)_2B(SCN)_2^{31}$ anion along with singlets at 2.78 and 2.97 δ for DME which is present in a 2:1 ratio of DME:anion.

Analysis, Found: C, 53.43; H, 6.14; N, 5.83%. $(C_6H_5)_2B(SCN)_2^-Na^+.(DME)_2$ requires: C, 54.60; H, 6.20; N, 5.79%.

This example demonstrates another possible pseudohalide containing boron complex anion with equal numbers of pseudohalide and aromatic substituents. Solutions of this salt in DME are organic electrolytes as is evidenced by the data contained in FIG. 5.

EXAMPLE 13

Triphenylboron 19.36 g (80 mmol), 100 mL dioxolane, and 3.92 g (80 mmol) NaCN are combined and are warmed to about 80° C. with stirring to dissolve the reactants. Filtration removes a small amount of insoluble material and the clear filtrate has a resistivity of 2450 ohm cm. The solution is concentrated to give a solid residue whose weight is equivalent to a 97% yield of $(C_6H_5)_3BCN^-Na^+.(dioxolane)_3$. Proton NMR analysis of the solid residue in DME shows an aromatic proton multiplet (6.8–7.4 δ) and singlets (3.68 and 4.73 δ) for dioxolane protons in a ratio which is consistent for a 3:1 solvate of dioxolane:salt.

Analysis, Found: C, 67.08, 66.97; H, 6.73, 6.40; N, 2.78, 2.79%. $(C_6H_5)_3BCN^-Na^+.(dioxolane)_3$ requires: C, 65.51; H, 6.48; N, 2.73%.

EXAMPLE 14

The relative stability of electrolytes to electrooxidation ($OX_{stab}$) is measured (in volts vs. $Li/Li^+$) by cyclic voltammetry on a Pt electrode at ambient temperature. A standard current of 1.0 mA/cm² is selected to compare relative values of $OX_{stab}$ determined in this manner. Dioxolane solutions of the new pseudohalide containing complex anion salt electrolytes of this invention are compared with certain dioxolane based electrolytes taught in prior U.S. patents, as shown in Table II below:

TABLE II

RELATIVE VALUES OF $OX_{STAB}$ DETERMINED BY CYCLIC VOLTAMMETRY

| Solute* | $OX_{stab}$ (volts)** | Source |
|---|---|---|
| $LiB(C_6H_5)_3(SCN)$ | 3.65 | Example 6 |
| $LiB(C_6H_5)_3(CH_3)$ | 3.40 | U.S. Pat. No. 4,060,674 |
| $LiB(N\underset{}{\diagup\!\!\diagdown})_3(C_2H_5)$ | 3.20 | U.S. Pat. No. 4,104,450 |
| $LiB(-\!\!\bigcirc\!\!-F)_3(CH_3)$ | 3.45 | U.S. Pat. No. 4,139,681 |
| $LiB(C_6H_5)_4$ | 3.42 | U.S. Pat. No. 4,104,451 |

*Dioxolane solution
**Voltage (vs. Li/Li$^+$) for 1.0 mA/cm$^2$ oxidation current on Pt.

Since the larger $OX_{stab}$ is the more stable the electrolyte is toward oxidation, this example demonstrates that salts of complex anions containing pseudohalide substituents can exhibit superior stability toward electrooxidation and are therefore highly desirable as organic electrolytes.

Having thus described this invention, what is desired to be protected by Letters Patent is presented in the following appended claims.

What is claimed is:

1. An electrolyte for an alkali-metal electrochemical device, comprising:
   (a) an organic solvent selected from a group consisting of ethers, esters, sulfones, organic sulfites, organic sulfates, organic nitrites and organic nitro compounds; and
   (b) at least one electrolytically active alkali-metal complex anion salt having the formula:

$ZMR_xQ_y$ wherein Z is an alkali metal;
   wherein M is an element selected from a group consisting of B, Al, P and As;
   wherein Q is at least one pseudohalide selected from a group consisting of: SCN$^-$, SeCN$^-$, CN$^-$ and OCN$^-$;
   wherein R is selected from a group consisting of: heteroatom-containing groups bonded to M, the core element, through the heteroatom site, aryls, alkaryls, F, Cl, Br, fluorine-substituted aryls, and fluorine-substituted alkaryls; and
   wherein x and y are positive integers, a sum of x plus y being equal to one plus the valence of the core element M, and further,
   wherein x is zero or a positive integer.

2. The electrolyte of claim 1, wherein said solvent comprises at least one ether.

3. The electrolyte of claim 2, wherein one of said ethers is dioxolane.

4. The electrolyte of claim 3, wherein said dioxolane is mixed with dimethoxyethane.

5. The electrolyte of claim 1, wherein Z is selected from a group consisting of Li, Na and K.

6. The electrolyte of claim 5, wherein Z is Li.

7. The electrolyte of claim 1, wherein M is B.

8. The electrolyte of claim 1, wherein the heteroatom-containing groups defined by R are selected from a group consisting of:

where X' is an alkyl having 1 to 3 carbon atoms.

9. The electrolyte of claim 8, wherein the heteroatom-containing groups defined by R are 10. The electrolyte of claim 1, wherein the alkali-metal electrochemical device is a lithium battery cell having a solid electrode for a cathode.

11. The electrolyte of claim 1, wherein the alkali-metal electrochemical device is a Li/TiS$_2$ battery.

12. The electrolyte of claim 1, wherein an aryl as defined by R is a phenyl radical.

13. The electrolyte of claim 1, wherein a fluorine-substituted aryl as defined by R is a para-fluorophenyl radical.

* * * * *